United States Patent
Oesch et al.

(10) Patent No.: US 12,307,273 B2
(45) Date of Patent: May 20, 2025

(54) DATA DRIVEN COMPUTER USER EMULATION

(71) Applicant: UT-Battelle, LLC, Oak Ridge, TN (US)

(72) Inventors: Timothy S. Oesch, Oak Ridge, TN (US); Robert A. Bridges, Oak Ridge, TN (US); Jeffrey A. Nichols, Oak Ridge, TN (US); Jared M. Smith, Oak Ridge, TN (US); Kiren E. Verma, Oak Ridge, TN (US); Brian Weber, Oak Ridge, TN (US); Oumar Souleymane Diallo, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 954 days.

(21) Appl. No.: 17/398,358

(22) Filed: Aug. 10, 2021

(65) Prior Publication Data

US 2022/0050697 A1    Feb. 17, 2022

Related U.S. Application Data

(60) Provisional application No. 63/064,209, filed on Aug. 11, 2020.

(51) Int. Cl.
*G06F 9/455* (2018.01)
*G06N 7/01* (2023.01)
*H04L 9/40* (2022.01)

(52) U.S. Cl.
CPC ............ *G06F 9/455* (2013.01); *G06N 7/01* (2023.01); *H04L 63/20* (2013.01)

(58) Field of Classification Search
CPC .......... G06F 9/455; G06N 7/01; G06N 20/00; H04L 63/20; H04L 63/1425; H04L 2463/121
See application file for complete search history.

(56) References Cited

U.S. PATENT DOCUMENTS

| 8,463,897 B2 | 6/2013 | Weerasinghe |
| 10,238,948 B2 | 3/2019 | Morton et al. |

(Continued)

FOREIGN PATENT DOCUMENTS

CN    110959153 A    *    4/2020    ............ G06F 9/451

(Continued)

OTHER PUBLICATIONS

Megyesi, P. et al., "User behavior based traffic emulator: A framework for generating test data for DPI tools", Elsevier, available online Oct. 3, 2015, pp. 41-54.

(Continued)

*Primary Examiner* — Rehana Perveen
*Assistant Examiner* — Nupur Debnath
(74) *Attorney, Agent, or Firm* — Warner Norcross + Judd LLP

(57) ABSTRACT

Whether testing intrusion detection systems, conducting training exercises, or creating data sets to be used by the broader cybersecurity community, realistic user behavior is a desirable component of a cyber-range. Existing methods either rely on network level data or replay recorded user actions to approximate real users in a network. Probabilistic models can be fit to actual user data (sequences of application usage) collected from endpoints. Once trained to the user's behavioral data, these models can generate novel sequences of actions from the same distribution as the training data. These sequences of actions can be fed to emulator software via configuration files, which replicate those behaviors on end devices. The models are platform agnostic and can generate behavior data for any emulation software package. In some embodiments a latent variable is added to faithfully capture and leverage time-of-day trends.

24 Claims, 9 Drawing Sheets

(56) References Cited

U.S. PATENT DOCUMENTS

| | | | |
|---|---|---|---|
| 10,719,301 B1* | 7/2020 | Dasgupta | G06F 8/34 |
| 10,776,252 B1* | 9/2020 | Weiss | G06F 11/3684 |
| 10,949,432 B1* | 3/2021 | Grayson | G06F 16/9035 |
| 2009/0319248 A1 | 12/2009 | White et al. | |
| 2016/0019465 A1* | 1/2016 | Milton | H04W 4/029 |
| | | | 706/52 |
| 2017/0161341 A1* | 6/2017 | Hrabovsky | G06T 11/206 |
| 2020/0104511 A1 | 4/2020 | Stolfo et al. | |
| 2020/0221338 A1* | 7/2020 | Luna | H04W 52/0258 |
| 2020/0250574 A1* | 8/2020 | Khazane | G06N 3/006 |
| 2020/0296007 A1* | 9/2020 | Finn | H04L 41/145 |

OTHER PUBLICATIONS

Updyke, D.D. et al., "GHOSTS in the Machine: A Framework for Cyber-Warefare Exercise NPC Simulation", Carnegie Mellon University, Software Engineering Institute, Sep. 2018, pp. 1-19.

Rossey, L.M. et al., "LARIAT: Lincoln Adaptable Real-time Information Assurance Testbed", IEEE Aerospace Conference, vol. 6, 2002, pp. 2671-2682.

Dutta, P.K. et al., "Simulated User Bots: Real Time Testing of Insider Threat Detection Systems", IEEE Symposium on Security and Privacy Workshops, 2018, pp. 228-236.

Studer, M. et al., "A comparative review of sequence dissimilarity measures", Universite de Geneve, 2014, pp. 1-48.

\* cited by examiner

Markov Chain Model (*m*=2)

Hidden Markov Model ($n_h$)

Random Surfer Model

DATA DRIVEN COMPUTER USER EMULATION

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

Network and host data from enterprise networked computing systems can be helpful for development and testing of various network tools, among other uses. However, such data, is generally not shared outside a given organization, making access to large, real-world datasets rather scarce. While the data can be simulated to some degree, the results are generally unrealistic.

Testing intrusions detection systems is one instance where realistic network traffic can be helpful. Generally, the most realistic traffic is generated when software is used to drive actual applications, thereby behaving like a real user. Tools that generate such realistic user behavior data are referred to as user emulators. However, conventional user emulators suffer in that they generally generate low fidelity traffic.

Some conventional technologies can enable emulation of user behaviors, such as web browsing, document editing, file transfer, and email. However, they do not emphasize realistic emulation. In general, existing user emulation technologies typically approach user behavior in one of the following ways (1) by modelling and generating network traffic directly, (2) replaying recorded user behaviors, or (3) using human generated configuration files approximated from real data. The computer user behaviors generated by these techniques generally can be relatively easily distinguished from real user behaviors, which significantly limits their usefulness.

One prior user emulation system is the GHOSTS system, developed at Carnegie Melon and available at https://github.com/cmu-sei/GHOSTS. The GHOSTS system focuses on building accurate, autonomous non-player characters (NPCs) for cyber warfare exercises and is available as an open source package. It allows the configuration of user behavior via configuration files, but the behavior is defined manually by the user.

Some known systems focus on emulating user network activity. For example, one such system utilizes a two-step process whereby a user profile is generated based on network traffic patterns and external resource usage of the user in the first step. Then, in the second step emulated network traffic is generated based on that user profile. However, these systems do not provide analysis or emulation of user application usage, merely network traffic. That is, the system only learns the network traffic patterns produced by a user, not the user's behavior at the application level. This system and method does not directly capture user actions.

There are some systems that generate models of user behavior based on user activity information (e.g., translating a database into action files and selecting/modifying action files for simulated user bots). However, these systems are limited because sequential and temporal aspects of user behavior are not learned when user activity is converted into action files. Accordingly, new realistic user action sequences cannot be generated. Although some systems may claim that action-specific user parameters can be learned from user activity data and applied to actions performed, there are at least two aspects that are not learned: (1) sequential patterns of actions; and (2) temporal aspects. Some previous systems utilize timestamps of monitored user activity to determine time gaps between actions, but none of them associate time of day with actions, hence the models are not "time-aware", which reduces their user emulation robustness greatly.

It would be helpful to provide user emulator that uses real user data to generate higher fidelity emulation and increase the accuracy of experimental results based on simulated user emulation data.

SUMMARY OF THE INVENTION

One aspect of the present disclosure relates to a method for collecting detailed computer-user activity data. The collected data is generally sufficiently rich to express one or more user behavior attributes. For example, the collected data may be sufficiently rich to express a temporal attribute, such as activity order, duration, or time of day.

Another aspect of the present disclosure relates to a computer user behavior probability distribution that models user behavior on a computer and allows generation of realistic sequences of user behavior, including one or more temporal attributes of user behavior observed in the data, one or more sequential attributes of user behavior observed in the data, or both. The user behavior probabilistic model can be utilized to generate simulated behaviors that are realistically similar to actual computer user behaviors. Output or samples from a user behavior probabilistic model in accordance with the present disclosure can be formatted and formed into a configuration file for use with a user emulator software package that can drive a device according to the generated behaviors. That is, the computer-user behavior configuration file can be processed by a user emulator to operate a device to simulate the generated sequence of user behaviors on a device.

Another aspect of the present disclosure relates to a behavior evaluation platform that tracks metrics associated with realism of the user behavior and can ensure that the distribution of user behaviors generated are virtually indistinguishable from that of a real user.

Embodiments of the present disclosure can be incorporated into larger systems. For example, the data driven user behavior emulation of the present disclosure can be incorporated into cyber technology evaluation software to provide realistic user behaviors. The user behavior emulation can be utilized to conduct cyber exercises, develop network- or host-level tools that utilize data from user actions (e.g., cybersecurity and network operational technologies), to develop machine learning or artificial intelligence models that leverage data from user actions, or develop cyber deception capabilities to name a few exemplary applications. Embodiments of the present disclosure enable simulation of the behavior of real computer users in a way that is higher fidelity than existing solutions.

Various embodiments can employ different representations of the behavioral sequences. Further, at least three different probabilistic models for sequential data can be employed in different embodiments: Markov Chain, Hidden Markov Model, and Random Surfer. Some embodiments emphasize sampling a unique next behavior (regardless of the specific sequential model used) and the duration to take the behavior, paired with the temporal latent variable.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENTS

Figure 1:
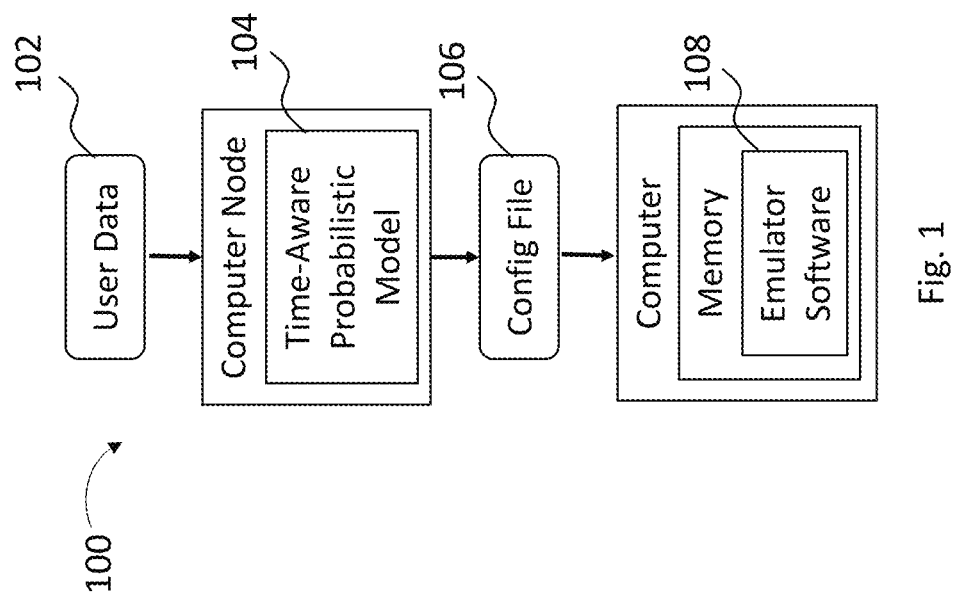
FIG. 1 illustrates an exemplary system in accordance with the present disclosure for generating a user behavior configuration file with a time-aware probabilistic model and emulating user behavior based on the configuration file.

The current embodiments of the present disclosure are generally directed toward data driven user emulation for the enhancement of cyber testing, training, and data set generation. In alternative embodiments, the data driven user emulation can be utilized for other applications. As discussed in more detail below, data driven user emulation refers to emulating computer user behavior based on a probabilistic model of real computer user behaviors. Some aspects of the present disclosure are directed toward collection of time-aware user behavior data, some aspects are directed to training a time-aware probabilistic model based on the user behavior data, and some aspects are directed to emulating user behavior based on output or samples of the time-aware probabilistic model. Time-aware user behaviors refer to rich computer user behavior data that includes at least one temporal attribute, such as sequence, duration, or time of day.

Realistic computer user behavior data can be useful in a myriad of different applications, such as training operators, developing novel models or technology, testing efficacy of various tools and computer methods. However, as noted above, sourcing large quantities of realistic computer user behavior can be difficult. The present disclosure provides a novel user behavior emulation technology that enhances the realism of cyber testbeds. Unlike current user emulators, embodiments of the present disclosure do more than replay previously observed behavior, or call heuristics for stringing together patterns of actions. Instead, embodiments of the present disclosure can generate novel sequences of realistic computer user behavior and orchestrate a plethora of virtual (and/or real) machines to enact these behaviors, thereby emulating a network of users. A novel sequence refers to an original sequence, that is, a sequence that is not simply a segment of a previously-observed sequence, or a sequence that result from simplistic manipulation (e.g., a set of hand-written rules) of a previously-observed sequence.

The time-aware probabilistic models of the current embodiments undergo a one-time training phase where a collection subsystem is configured to collect data on real computer users and create probabilistic models of each user's unique patterns of behaviors. These models enable the production of new user behavior sequences that appear similar to the real user's behavior.

The realism of these generated behaviors can be evaluated objectively. For example, in one embodiment, a sequence-visualization software package can be executed, which visually depicts the sequence in such a way that a user can perform a visual inspection/quality analysis to gauge realism of the generated behaviors. The behaviors can be evaluated according to a suite of metrics allowing visual quality analysis to measure the realism of the generated behaviors. Behaviors that pass the evaluation, can be fed into emulation software that can actuate those behaviors on real or virtual devices—essentially through emulation creating a "digital twin" of the user on that device.

Referring to FIG. 1, an exemplary flowchart for a data-driven user emulation system 100 is illustrated. The data-driven user emulator 108 of the present disclosure utilizes one or more models 104 learned from the usage patterns 102 of real computer users to drive emulation software 108 that behaves like a real user on a computer upon which it is installed. In general, user behavior data 102 can be fed into a computer node. The computer node is configured to build a time-aware probabilistic model 104 that can then generate new user behavior configuration files 106 to drive user-emulator software 108. When the user-emulator software 108 is executed with the configuration file(s) 106, it causes the computer upon which the emulation software is executed to simulate the behavior of a human computer user. Accordingly, the data-driven user emulation system utilizes a time-aware probabilistic model 104, trained on real users' data 102, to create learned behavior patterns. Behaviors produced by the model are original sequences of actions because they are sampled from the probability model, yet they appear as if they were performed by the same user, because the model was fit to real user data. The configuration file(s) 106 generated by the model drive the emulator software 108. That is, the emulator 108 interprets the behavior sequences from the configuration file and causes the computer to independently behave like a real user on any computer where it is installed.

Figure 2:
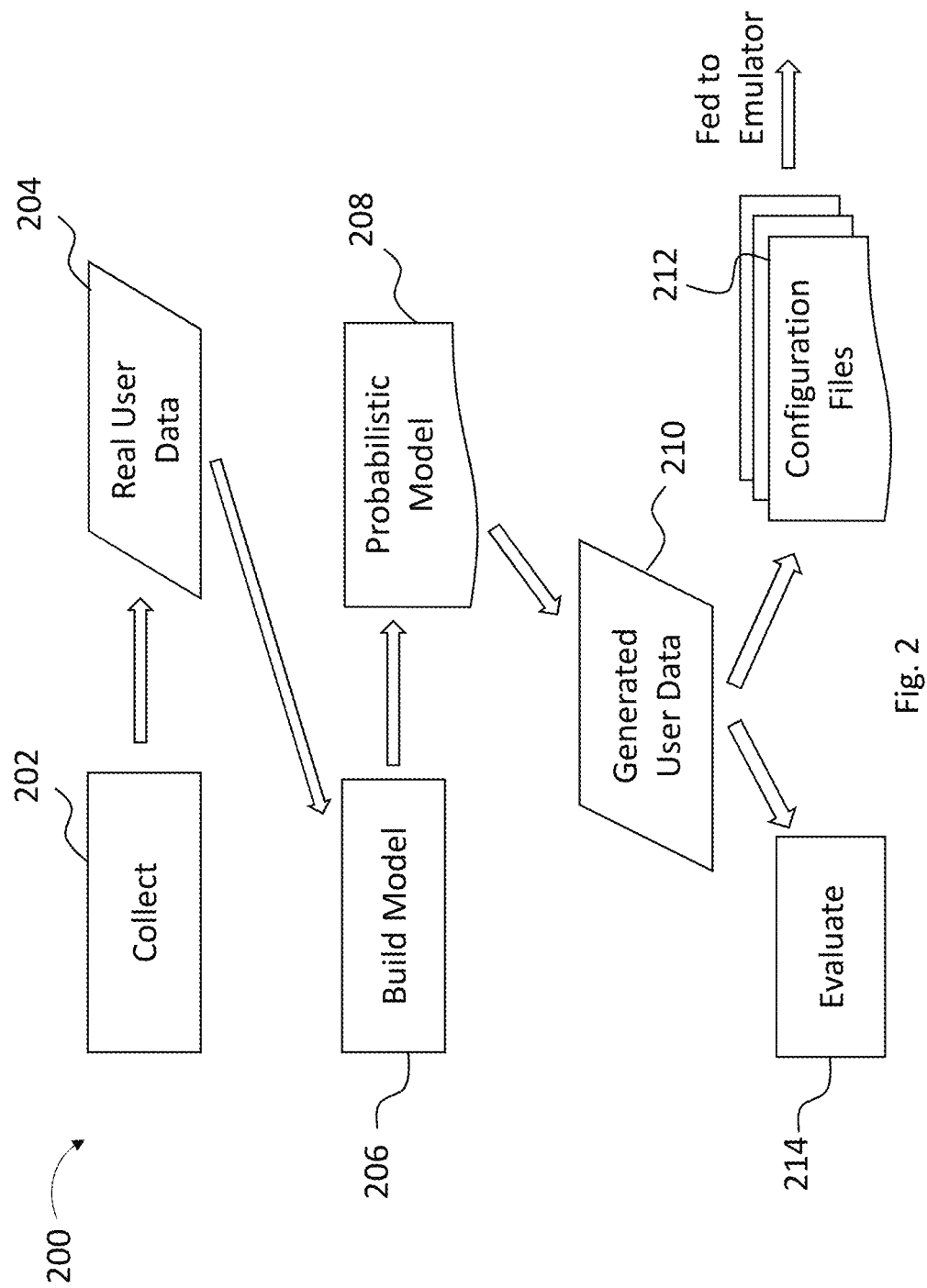
FIG. 2 illustrates a flowchart for building, employing, and evaluating a time-aware probabilistic model for computer user behavior emulation in accordance with the present disclosure.

Referring to FIG. 2, a time-aware user behavior model training workflow 200 is illustrated. The first step of the workflow is collection 202 of real user data 204. In the current embodiment, the time-aware data collected from users includes a timestamped sequence of "active applications". An active application generally refers to the application where the user's attention or focus is and can be represented and tracked generally as the front-most application window due to the way in which modern operating systems are programmed, however in alternative embodiments the "active application" may be defined or tracked in a different manner. As an alternative example, the system can be configured to extract user behavior sequences from browser and/or host audit logs, which can be collected from most operating systems. This alternative provides real user data regarding files accessed and websites visited, as well as application data that reveals more of how a user utilizes an application so that models for each application can be built. The real user data can be sampled periodically at a high frequency, along with metadata on the active window. For example, in one embodiment the timestamped sequence of active applications can be sampled at a rate of 0.5 seconds along with the names of the active window's title. In alternative embodiments, a different sampling rate can be utilized and different metadata can be collected.

A time-aware probabilistic model 206 can be built/trained from the collected data. In the current embodiment, the time-aware probabilistic model can include one or more of several time-of-day specific mixture models, where components of the mixture models are probabilistic models (e.g., Markov Chain, Hidden Markov, and Random Surfer models). The specific combination of mixture models can vary from application to application. Details regarding building/training the time-aware probabilistic model 206 are discussed in more detail below.

The trained time-aware user behavior probabilistic model 208 can be utilized to generate sequences of new, unique, realistic user behaviors or data 210 that differ and are virtually indistinguishable from real user's data. Put simply, the probabilistic model 208 can be sampled to generate new active application sequences that are similar, if not identical in form, to the form of the input data used to train the model.

The sequences of computer user behaviors 210 can be processed into a configuration file format that user emulation software is configured to accept. For example, the generated user data 210 can be converted into one or more time-aware computer user behavior configuration files 212 that each include timestamped actions (e.g., active applications) with durations and action-specific parameters can be generated based on the generated user data 208. User emulation software is well known and therefore will not be discussed in detail; suffice it to say, embodiments of the present disclosure can be configured to work with a variety of different emulators and emulation platforms. The configuration file provided to the emulator can provide sufficient information to accurately emulate a real computer user engaging in that sequence of activities.

The fidelity of the computer user behavior model can be evaluated 214 by comparing model generated sequences to real data sequences, as discussed in more detail below. Although the workflow illustrates the generated user data being passed to the evaluation platform and being formed into configuration files for being fed to the emulator in parallel, in some embodiments, passing the configuration files to the emulator may be contingent upon a particular score or evaluation rating in order to ensure a particular fidelity of user behavior is output by the system. The evaluation rating can be dynamically changed by the system operator according to a variety of different thresholds and metrics. Further, in some embodiments, the evaluation platform 214 may be interposed between the configuration files and the emulator to act as a gatekeeper.

Figure 9:
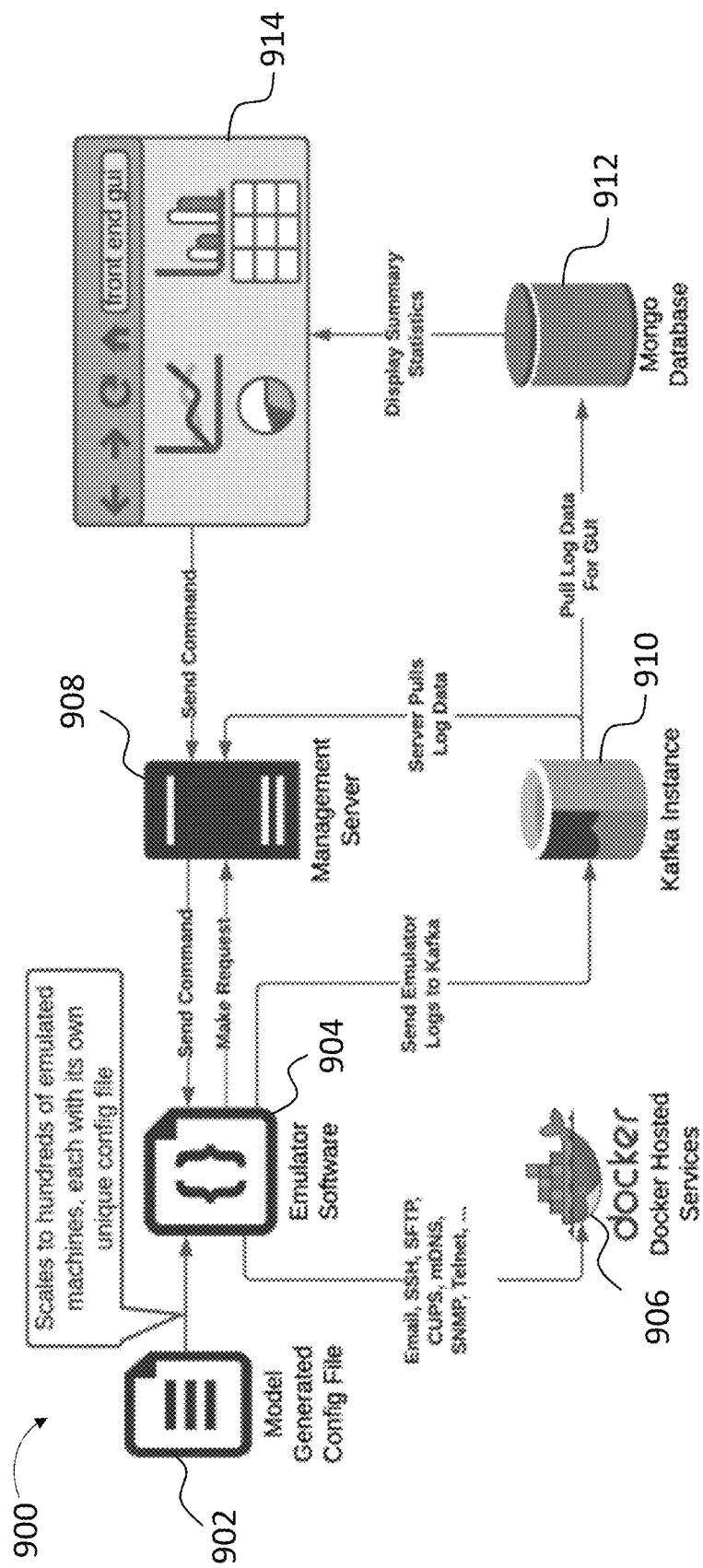
FIG. 9 illustrates exemplary software architecture for orchestrating emulation of time-aware user behaviors.

A representative diagram of an exemplary software architecture 900 for emulating user behavior from a configuration file based on a time-aware probabilistic model is illustrated in FIG. 9. This software architecture enables an analyst to view the status of, and send commands to, all active user emulators. All user emulators can be configured to send log information to a log server 910. A front-end graphical user interface 914 can consume this log information and allow individuals to review the status of the emulators. Commands can also be sent to the individual user emulators through an orchestrator module 908 using the front-end interface. The architecture is scalable, enabling hundreds, thousands, or more emulators to run simultaneously. The architecture is also extensible, allowing additional user actions, such as web browsing, or document surfing to be added and ended with minimal effort. Further details about the software architecture 900 are discussed below. Suffice it to say, in the exemplary embodiment, the software architecture 900 is configured such that the network traffic between the emulated user 904 and the management server 908 are out of band from the traffic generated by the emulated user node (e.g., traffic to hosted service 906, such as email, SSH, SFTP, CUPS, mDNS, SNMP, Telnet, or other hosted services). Thus, simulated traffic from the emulated user's actions to hosted services 906 is separate and distinguishable from the traffic with the management server 908.

The process of configuring a computer node to create a generative data-driven user behavior model will now be described in detail. Data is collected from a wide variety of users over a sufficient period of time. In one embodiment, about ten to forty days of user data over a period of about eight hours per day at a sampling rate of 0.5 seconds provided sufficient user data to train a robust time-aware probabilistic model. In alternative embodiments, data may be collected over a shorter or longer time period. The time-aware real user data collected generally includes (1) a timestamped sequence of "active applications" sampled periodically at a high frequency, e.g., 0.5 seconds, and (2) other timestamped metadata, which may include whether a user is idle, quits an application, opens a new tab, or essentially any other user behavior.

An "active application" can be defined differently in different embodiments. In one embodiment, the active application can be defined as the front-most application in the operating system's user interface receiving key events at a given time point. Obtaining sequential data from a particular user or set of users as input, the algorithm of the present disclosure can produces a high-fidelity probabilistic model that generates new sequences similar to the inputs with regard to at least three attributes (1) sequencing, the order of distinct applications, e.g., the order in which a user jumps from one application to another, (2) duration, the distribution of consecutive subsequence lengths for each application, e.g., uninterrupted time spent in each application, and (3) timing, the time(s) of the day at which application each application is used. Various embodiments for each algorithm can include data preprocessing step(s) along with a stochastic model such as a Markov model or a Random Surfer (i.e., a mixture of a Markov model and a multinomial), model. New sequences generated by the model can be transformed into a configuration file that can be fed to emulator software.

By emulating user behaviors generated via an embodiment of the present disclosure on many devices on a network, a variety of problematic use cases can be addressed, including: (1) generating realistic host and network data for testing cyber tools (e.g., needed to evaluate emerging cybersecurity technologies, such as User Behavior Analytics (UEBA), Anomaly Detection (AD), and Intrusion Detection System (IDS) technologies), (2) creating cyber deception technologies (e.g., camouflaging real users/traffic with realistic emulated versions), (3) creating training data for machine-learning-based IT and cyber tools, (4) enhancing the realism of cyber exercises (e.g., red-team events for testing and practicing network defense), and (5) generating novel datasets to support both research and industry.

While the data driven user emulation can be run in a cyber-testbed at a small scale, the data driven user emulation can also be run in a cyber-testbed at a large scale, e.g., with 300+ active emulated users, to support large scale experiments involving defensive cyber technologies or other applications.

There are a number of different ways to represent the sequential user behavior data, which informs the probability model structure. For example, sequential data can be represented with repeated symbols (STS, or symbol state sequence, e.g., aaabbcaa) or non-repeated symbols each paired with their duration (DSSDS, or distinct successive state duration sequence, e.g., (a,3) (b,2) (c,1) (a,2)). Further, the model structure can be organized using the original sequences (Flat) or with a latent layer can be added to model time-of-day trends (Hierarchical). The sampling process can be informed by the data representation. For example, for DSSDS a symbol (a) can be sampled and then a duration (3) can be sampled, as opposed to STS where symbols are sampled at each timepoint (e.g. a, a, a). This sampling process can be selected according to the model and thus facilitate the level of realism. At least three standard sequence modeling approaches can be utilized as probabilistic models that take the sequential user data as input: Markov Chain, Hidden Markov Model, and Random Surfer model. In general, the unique symbols paired with durations (DSSDS) generally replicates realistic "spell lengths", and the Hierarchical model captures temporal trends well.

Alongside the modeling capability, the present disclosure also provides software to simulate user actions on end devices and to monitor/orchestrate the emulators. A unique configuration file produced by the model can be fed to the emulation software running on each device, which then can enact the specific behaviors on that device. The emulator software can be written to be extensible, so that new behaviors can be added with minimal effort, and to be scalable. A full stack web application can allow users of the system to monitor and send commands to emulators running within their cyber range.

The data driven user emulation files produce realistic network traffic, e.g., where the previously used concurrently opened applications make background traffic, as opposed to bursts of network traffic.

Various embodiments of a data-driven model for computer user behavior generation will now be described in detail. To create a data-driven model of a user behavior, data recording a user's activity is collected from the user's host for an ample period of time (e.g., many days to weeks). The data is used to train a probabilistic model, that is, an algorithm that, once trained, can be used to produce original sequences of activities that mimic the input data's qualities and that are stochastic, and that are therefore subject to variability of the fit probability model.

To create a data-driven user behavior model, data is collected from a wide variety of users over a sufficient period of time and fed to an algorithm that produces a probabilistic model.

The term probabilistic model generally refers to a model that learns a joint probability distribution between input data and labels for that input data. That is, a computer user behavior probabilistic model in accordance with the present disclosure models a probability distribution of that user's actions based on observations of that user's prior sequence of activities. In essence, the user behavior probabilistic model is a probability distribution fitting to a sequence of data concerning the user's measured computer behaviors. This can be extended to a general user or a certain category of user by collecting data from many different users (or users of a particular class) and learning a joint probability distribution based on that data.

The data collection and preprocessing for training a user behavior probabilistic model will now be discussed in detail. A collection script can be prepared and deployed to a user's host computer, which records a timestamped observation each 0.5 s of the user's "active application", i.e., the frontmost application in the operating system's (OS's) user interface (UI). This is one way in which to record the user's computer use behavior and in alternative embodiments, other metrics to track the user's active application can be utilized.

The script can be written essentially in any programming language. In the current embodiment, the collection script is a Python script that leverages AppKit, a package for Mac OS data collection. However, analogous collection scripts for other operating systems and scripting languages can be utilized in alternative embodiments.

In the current embodiment, each record is stored as a tuple that includes a timestamp, process identifier, and application name. In alternative embodiments, additional or different data can be recorded in connection with each record, e.g., particular metadata.

The sample frequency of 0.5 seconds provides a good balance of the amount of data collected relative to the amount of changes of active applications for most users. In alternative embodiments, the sample frequency can be increased or decreased. Further, although the current embodiment of the system is configured to collect data continuously for an eight-hour period, the collection period can be increased or decreased in alternative embodiments, or dynamically controlled by the user's data being collected or a system administrator.

In the current embodiment, the collection script is configured to automatically pause during machine sleep periods. By default, the machines being logged in the current embodiment were configured to go to sleep after a few minutes of inactivity, and upon returning, the user would encounter the login screen. Different embodiments can handle machine sleep in a variety of different ways. In the current embodiment, the script is configured to record the login window as the application name before the computer would execute the sleep and pause in logging, which allows the data driven user behavior models to generate realistic pauses in the user's day.

Each run of the collection program provides a time series of active app observations:

$$(s'(t_0), \ldots, s'(t_L))$$

where $t_{k+1} = t_k + 0.5\text{s}$ for most $k$, and $$L = 8 \text{ hrs} \times \frac{60^2 \text{s}}{\text{hr}} \times 2 = 57.6\text{K observations}$$

s' denotes the raw sequence, reserving the simple notation s for its analogous sequence of applications after preprocessing.

After a sufficient number of observation sequences from a user have been collected, the data can be normalized to have the following properties:

A single sequence per day, filtering out days in which there is insufficient active data (e.g., user was logged out). When denoting the sequence for a particular day, $s^i$ denote the sequence for the i-th day.

A uniform start and end time (which can depend on the user); the system can define a minimum start time $(\min_s, t_0)$ and maximum end time $(\max_s, t_L)$ observed.

Uniform and uniformly spaced timestamps in each day's sequence (i.e., all s can be normalized to sequences with the same time stamps, coarsened to five second intervals. This can be done by setting s(t) to be the closest previous observation:

set $s(t) := s'(t_k)$ where $t \in (t_{\{k\}}, t_{\{k+1\}})$

Where there is a large gap in a day's data collection (e.g., from the collection script ending but not being restarted quickly) copies of subsequences of s' occurring before and after the gap can be utilized to fill in the unknown portion.

Seldom used applications, e.g., applications that are active in only a single collection period or that take up less than 1% of the data, can be replaced with a distinguished symbol, e.g., RARE, effectively binning all infrequent observations.

This normalization can provide uniform sequences of user behavior data over a period of time, such as several days. From here, the system can consider the sequential properties and models that faithfully reproduce those properties, which will now be discussed in detail.

Computer user behavior models in accordance with the present disclosure are generally high-fidelity probability models that learns a user's behavior and generate an arbitrary number of new actions for each user modeled. While these action sequences are different from the real user data upon which they are derived, they are high-fidelity, i.e., realistic in many aspects.

A "high-fidelity" model can be defined in terms of the similarity of the activity sequences the model generates to that of the true user sequences; consequently, gauging how "good" a model is depends essentially on defining similarity of two sequences. Sequential data appears in a wide variety of domains. Hence, a wide variety of similarity measures for sequences exist; e.g., string metrics such as Hamming for binary data, edit distances (e.g., Levenshtein) often used for text applications, or Kendall-Tao distance often used for ranking comparisons, to name a few.

Figure 3:
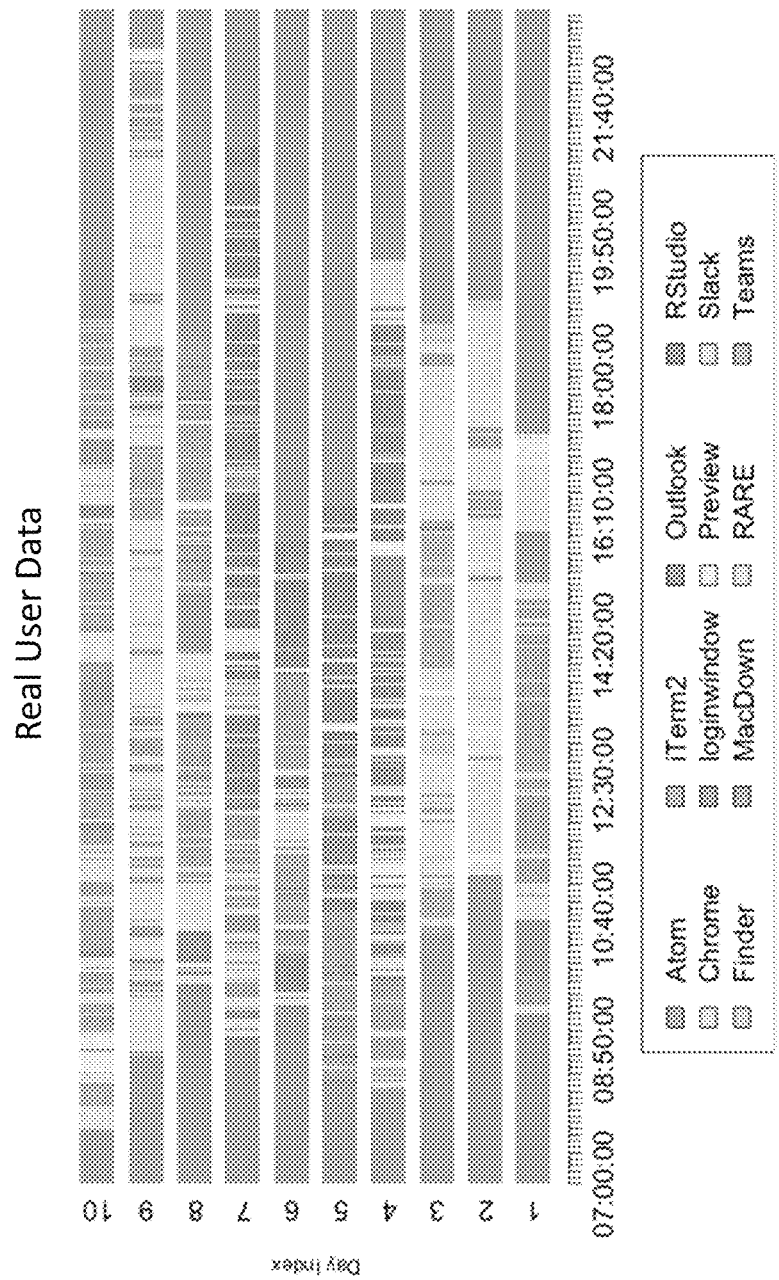
FIG. 3 illustrates an exemplary data set of real user data on which a time-aware probabilistic model can train.
Figure 6:
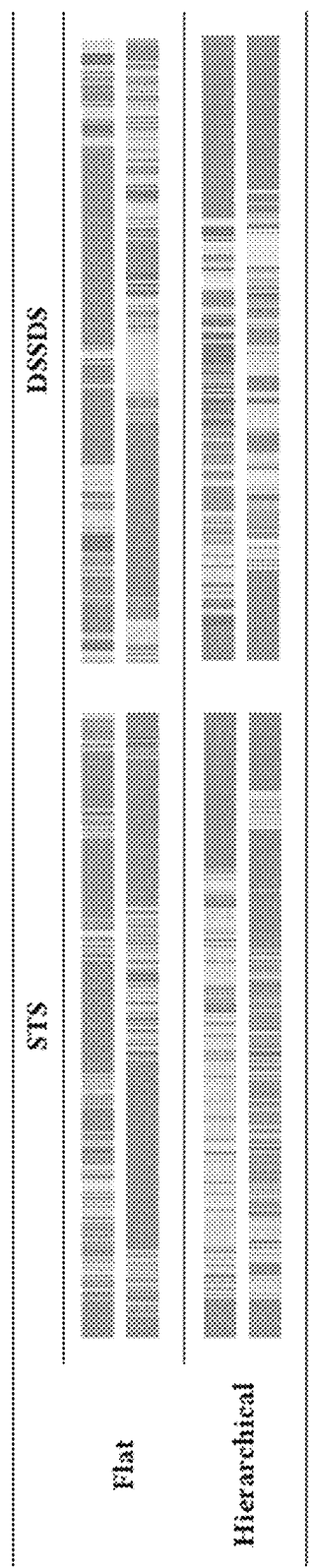
FIG. 6 illustrates exemplary data sampled from a trained Markov Chain of order 1 for a combination of structural options.

FIG. 3 illustrates a sample set of exemplary real user data and FIG. 6 illustrates exemplary generated user data output from several variations of time-aware generative user models in accordance with the present disclosure. In particular, FIG. 3 illustrates ten days of exemplary real user data and FIG. 6 illustrates four different exemplary user activity sequence generated by a time-aware generative user model trained on the FIG. 3 data. In FIGS. 3 and 6, a visual representation of the application sequence is provided by showing different applications represented by different greyscale values. FIG. 3 lists a key of the various exemplary applications and their corresponding grayscale values. In FIG. 3 there are ten sequences provided where the grayscale value represents the various different applications active at the moment of the sample. That is, with respect to the real user data, the active application was sampled at a particular frequency and each unique application has been assigned a different identifier value such that the real user data includes a sequence of timestamps and identifiers, or an equivalent thereof. For explanation purposes, the particular applications and particular sequences of applications are not insightful, suffice it to say, a user's attention is split among a number of different active applications throughout a workday often with a number of pauses and breaks. There are numerous patterns that emerge by training a time-aware probabilistic model on this data—patterns that would be difficult, if not impossible to ascertain in an efficient manner by meticulous manual review of the data.

This user behavior data can be stored in a variety of different ways. For example, the user behavior data can be stored in local or remote memory. The data can be stored in essentially any suitable format and memory structure such that a time-aware sequence of active applications can be derived from the stored user behavior data. For example, in some embodiments, a timestamp is only recorded if the active application changed relative to the previous active application. The format of the data output by the probabilistic model can be the same (or a different) format than the real user data input into the time-aware probabilistic model.

Referring to FIG. 3, which visualizes ten days (sequences) of a user's application usage, there is a wide variance in behaviors that characterize real user data. Different application distributions appear at different times. Occasionally long spells of a particular app occur, while short spells are very common; Toggling applications can be observed, where a "core" app dominates a time period but is interrupted frequently with short visits into one or two other apps. Finally, there is a general time window of work hours in the day for this user. Ultimately, one goal of the system is that when trained on data such as that shown in FIG. 3, it will produce data that has similar qualities. While the general workflow for creating such a model is to identify metrics that measure the desired qualities, and then leverage the metrics to design and evaluate models, it can be difficult to ascertain what combination of sequential measures capture the qualities of real user's behavior.

In order to address this issue, the data-driven user behavior model learns the sequential and temporal aspects of a user's actions based upon the following aspects. Specifically, the system considers similarity of sequential activity data with regard to at least four sequence properties, sometimes referred to as dimensions or sequence characteristics:

Distribution—the total time spent in each distinct application.

Duration—the number of consecutive observations of the same application (equivalently, uninterrupted time spent in each application);

Sequencing—the ordering of distinct applications (i.e., order in which a user jumps from one application to another);

Timing—the time(s) of day at which each application is used;

The system includes methods for quantifiably measuring the fidelity of generated sequences corresponding to these aspects to ensure realism of the probabilistic models. If an evaluation system is utilized, it can mark or automatically toss out any sequence generated by the user model that does not meet a certain fidelity threshold.

Each unique user configuration file produced by the probabilistic model can be installed on a physical or a virtual device containing emulator software. The emulator software can actuate the device to behave like a real user based on the configuration file. The emulator status can be logged and displayed in a web interface, downloaded, or otherwise be made available. The web interface can allow commands to be sent to specific emulators via an orchestrator.

Figure 4:
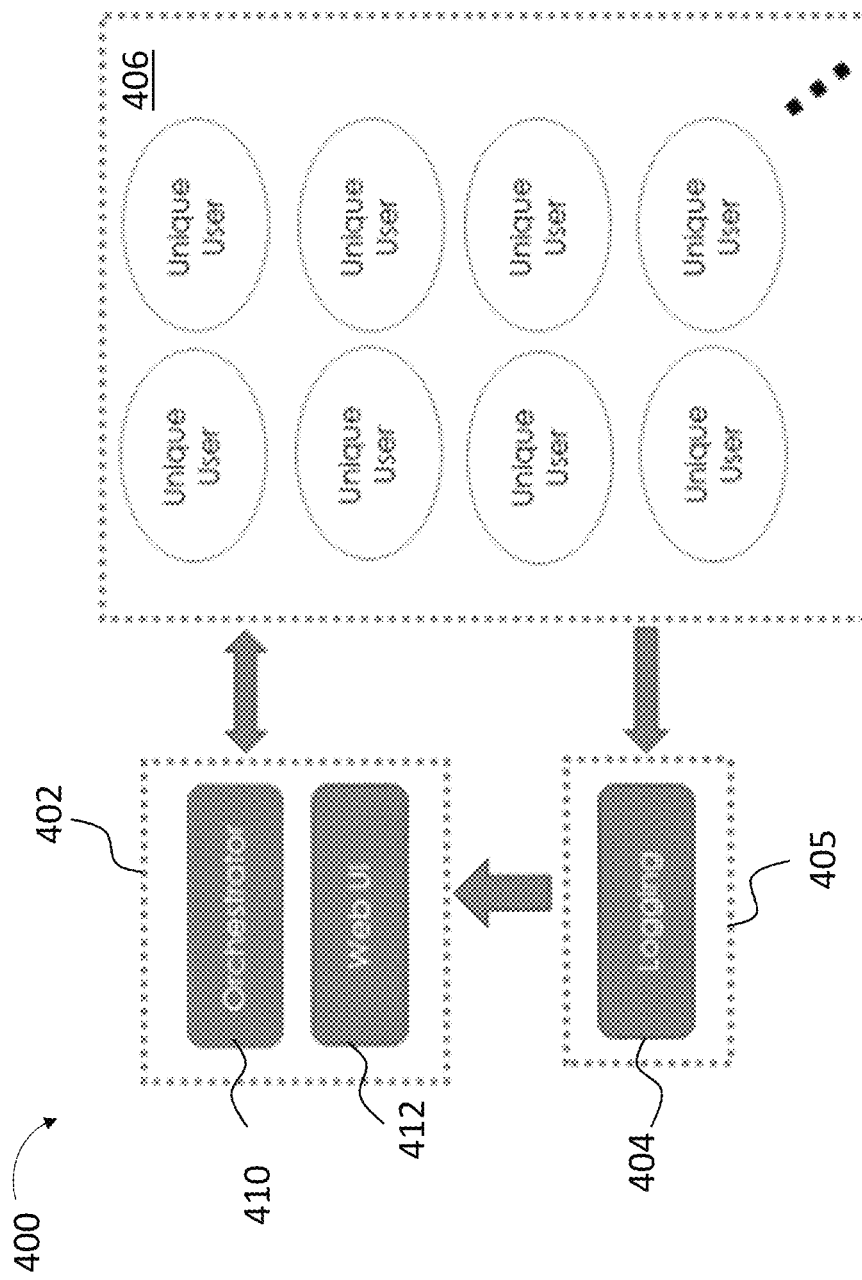
FIG. 4 illustrates an exemplary system architecture including an interface module, user emulation module, and logging module.

An exemplary system architecture 400 including a user emulation module 406, a logging module 404 system, and an interface module 402 in accordance with one embodiment of the present disclosure is illustrated in FIG. 4. The interface module 402 can include an orchestrator 410 submodule and a web user interface 412 submodule. The orchestrator 410 can include memory and software that when executed by a processor causes a user emulation software module 406 to execute software that emulates one or more unique user's behaviors based on one or more configuration files. The web user interface 412 can be utilized to obtain status updates on the user emulation, upload new configuration files, and to download configuration files, among other interface tasks. The user emulation software module 406 can output data to a logging module 404, which can be stored in memory and accessed by the interface module or communicated to the interface module 402. The various modules, i.e., the user emulation module 406, logging module 404, and the interface module 402 can be implemented on a single computer or multiple computers networked together. The computers may be remote from one another and communicate over the Internet or another network.

The user emulation of the present disclosure provides essentially unlimited, new, unique, realistic users that can be deployed using the probabilistic model. Unlike previous user behavior generators, these generated users do not require additional data collection and are realistic with regard to both timing and sequence.

Embodiments of the present disclosure can be incorporated into larger systems. For example, some systems that can incorporate the user emulation of the present disclosure include: network traffic generation, software-defined shadow networks/cyber deception tools (a market of tools that use virtual, seemingly real assets to camouflage real assets and prevent adversaries from identifying real nodes), impersonation of specific computer users, usage in cyber exercises, red team deployments, research, testing of non-security IT tools and technologies, and, generation of data for development of machine learning or artificial intelligence technologies.

In order to aid description and understanding of the present disclosure, several terms and notation are mentioned here:

The terms state and app and symbol are used interchangeably throughout the disclosure to refer to the user's active application.

A Symbol Time Sequence (STS) is a sequence s(t) where each element of the sequence $s(t_i)$ denotes the symbol at time $t_i$.

A spell is a consecutive subsequence of the same symbol, or equivalently, an uninterrupted period spent in the same application; it follows that spell length, the number of consecutive same symbols, is duration as defined above.

The Distinct Successive States (DSS) is the sequence of non-repeated symbols observed, where all spells are treated as length 1. We denote a DSS using u=(u(1), . . . , u(m)).

A Distinct Successive State Duration Sequence (DSSDS) is a sequence of (symbol, spell duration) tuples for each spell in the DSS.

By way of example, for a particular user behavior sequence tracked using symbol time sequence, s=(a,b,b,b,a,c,c) there are three states or symbols, namely, a, b and c; symbol a has two spells of length 1, b has a spell of length 3, and c has a spell of length 2; the DSS is u=(a,b,a,c); the corresponding DSSDS is ((a,1), (b,3), (a,1), (c,2)).

The DSSDS is a redundant but alternative specification of the original STS. Choosing whether to consider a user activity sequences as an STS or a DSSDS can impact model choice and accuracy.

In accordance with the present disclosure the system provides a flexible framework for modeling user activity sequences where a particular model can be specified by three decisions:

(1) Sequence Representation: STS or DSSDS;
(2) Temporal Structure: Flat or Hierarchical.
(3) Sequential Model Type & Hyperparameters: Markov Chain (MC), Hidden Markov Model (HMM), or Random Surfer (RS); hyperparameters vary per model type Referring to FIG. 5, four exemplary graphical model frameworks for representing the sequence representation and temporal structure of a user behavior model of the present disclosure are illustrated. Here $s_t$ denotes the STS, i.e., $s_t$ is the app in use at timestamp t; $(u_i, d_i)$ denotes the DSSDS, i.e., $u_i$ is the i-th app used for duration $d_i$; and $c_w$ denotes the cluster for time window w. Dotted lines indicate dependence, as dictated by the specific model types. Beginning with the Flat STS model 502, it simply samples $s_t$ (the app at time t) with a model that depends on the previous times' apps (conditioned on $s_j$ for j<t). Moving to the Flat DSSDS model 504, it samples the next app $u_i$ conditioned on the previously used apps ($u_j$ for j<i), and samples the duration $d_i$ conditioned on $u_i$. The solid arrow indicates that $d_i$ depends on $u_i$ and is computed simply by counting and dividing frequencies seen in the training data; specifically, computed as:

$$P(X_i | Pa_{X_i}) = \frac{\#(X_i)}{\#(Pa_{X_i})}$$

where $Pa_{X_i}$ denotes the parents of node $X_i$, and #( ) denotes the empirical frequency of the node(s)' value(s). Moving to the Hierarchical models 506, 508, for each 1-hour time window w a cluster $c_w$ is sampled, depending on the previous time windows' clusters. As indicated by the rectangles, each cluster ($c_w$) dons its own Flat model (either STS or DSSDS), which is used to sample the app usage within that 1-hour time window. Note that for some models, dotted dependencies exist that are not shown; e.g., for a Markov chain of order 2 (a Flat STS model), $s_t$ is dependent on $s_{t-2}$ as well as $s_{t-1}$, and for a Hidden Markov Model (a Flat STS model), the dependencies are between the hidden states, $H_{t-1}$, $H_t$, are not depicted.

Figure 5:
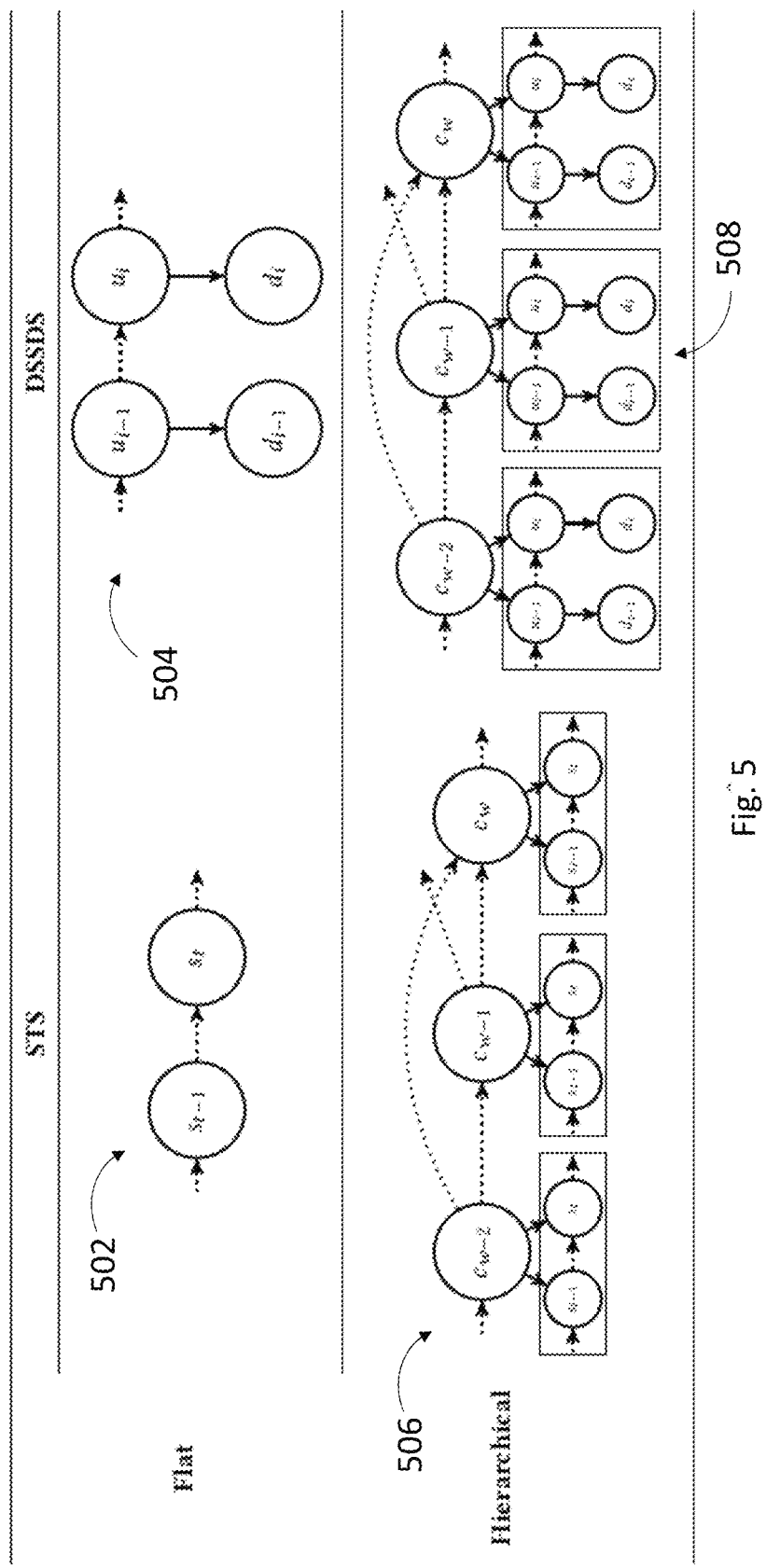
FIG. 5 illustrates four exemplary graphical model frameworks that illustrate two exemplary sequence representation structures (STS, DSSDS) using original sequences (Flat) or a latent layer to model time-of-day trends (Hierarchical).

The four illustrated graphical model structures depicted in FIG. 5 are organized with rows/columns corresponding to the pair of structural dichotomies (Flat vs. Hierarchical) and (STS vs. DSSDS). Sequential model types are shown in Table 1 below along with exemplary model-specific hyperparameters. Each of the four structures require one of the three exemplary model types from Table 1, yielding a total of 12 model combinations.

TABLE 1

| Model Type | Exemplary Hyperparameters |
|---|---|
| Markov Chain | m = 1, 2 |
| Hidden Markov Model (HMM) | $N_h$ = 3, 5, 7 |
| Random Surfer (RS) | A = [20, 20], $\beta_{i,j} = \delta_{i,j} = 1.1$ |

Two exemplary sequence representation structures will now be discussed in detail: Symbol Time Sequence (STS) and Distinct Successive State Duration Sequence (DSSDS). The STS structural choice simply means that the sequence models (MC, HMM, Random Surfer) will regard and generate the original, full, STS sequence, which includes repeated symbols (constant subsequences) if an app is used for consecutive time intervals. On the contrary, the DSSDS structural choice indicates that the sequence model will be trained on and generate a DSS (Distinct State Sequence, containing no repeated symbols) combined with a duration sampled from the duration distribution for the chosen symbol. More specifically, a symbol is drawn from the symbol model; then, the duration for the chosen symbol is sampled from the given symbols' duration probability distribution. The spell duration distributions are learned for each symbol from all training sequences.

Figure 7:
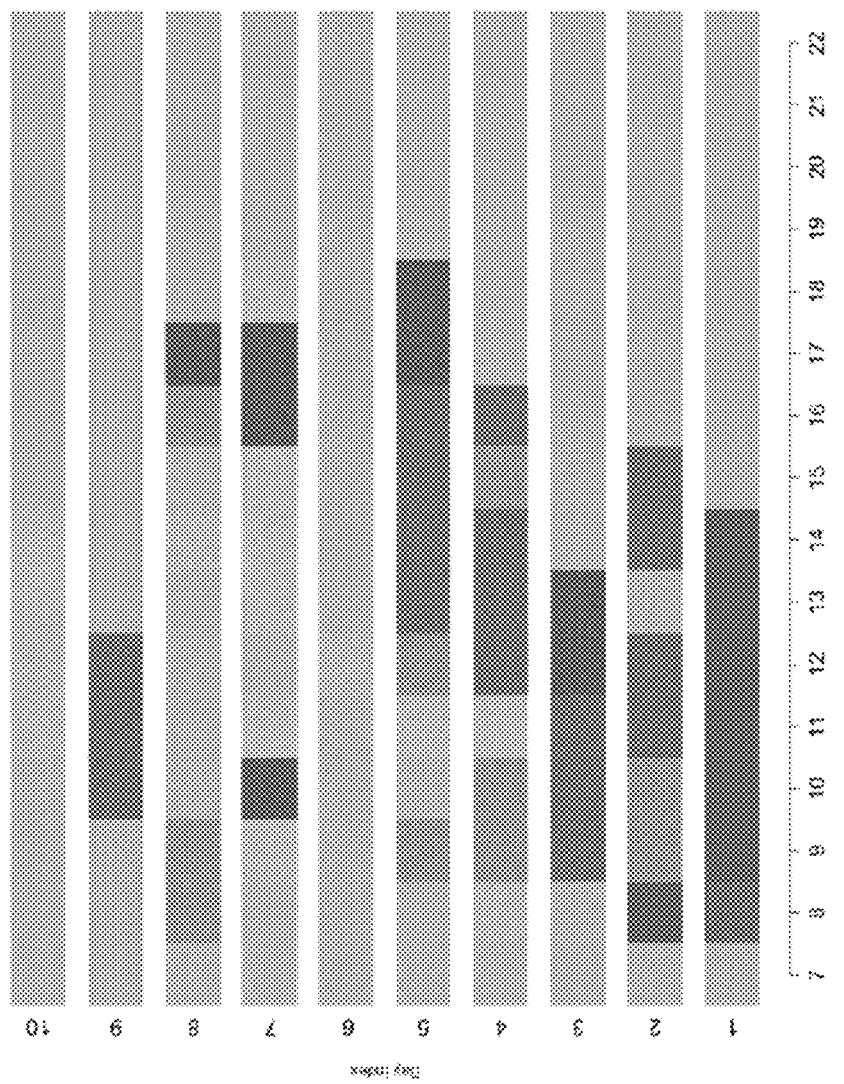
FIG. 7 illustrates clusters for each 1-hour time window derived from user data of FIG. 3 with K=7 for a Hierarchical temporal structure.

Several temporal structure options will now be discussed. A flat structure choice indicates that the sequence model, e.g., from Table 1, will be trained on and generate a whole day's sequence data (based on structural choice for the representation of the day's sequence). Whereas the Hierarchical structure choice incorporates a latent variable c that tracks the time of day. For the Hierarchical structure, the input data sequences are split into time window subsequences (e.g., 1-hour windows), vectorized, and clustered via K-means clustering. An example of clusters for each 1-hour time window (w) found for user data from FIG. 3A is shown in FIG. 7 with K=7 for a Hierarchical temporal structure. Parameter K can be learned from each user via the elbow method. Next, let $v_1, \ldots, v_K$ denote the cluster centers, which are the expected percent each application appeared in that cluster's constituent data. Since each (1 hr) time window, w, in the training data has a cluster assignment, $c_w \in [1, \ldots, K]$, a Markov distribution of order 2 can be learned on the sequence of clusters observed. This can be used to generate a cluster for each hour of the day and is different than the sequence model used for generating the application sequence on 5 s intervals. Finally, a (per cluster) sequence model can be trained from the data in each cluster, resulting in app sequence models $M_1, \ldots, M_K$ (based on the other structural and modeling choices). These K user models attempt to capture that users' behavior as observed in the data that forms that particular cluster. The probabilistic model process is then as follows: at each time window (w) a cluster ($c_w$) is chosen based on the current time window, and the previous two chosen time window clusters; a subsequence for that time window (that hour of the day) is generated from the corresponding cluster's app sequence model ($M_{c_w}$). A priori, the benefit of this approach is that natural differences in behavior throughout the day are taken into account. This hierarchical structure also generates higher variance sets of sequences, which tends to produce more realistic sequence sets.

Several exemplary sequential model types will now be discussed. The Markov Chain (MC) model uses an MC model of order m as the lone hyperparameter; i.e., the probability of a symbol depends only on the previous m symbols. This model can be learned from the input data sequences and implemented using the Pomegranate Python package or another equivalent software package. A Hidden Markov Model (HMM) is comprised of $n_h$ hidden or latent states ($n_h$ is a hyperparameter), an MC model for transitioning among the hidden states (of order 1 in our case, so a transition matrix), and each hidden state is furnished with an emission probability, which is a distribution over the observed symbols. The generative process uses the transition matrix to sample the latent state, then a symbol is sampled from emission probability for that state. This model can be trained from the input data sequences using the Baum-Welch algorithm or another suitable algorithm and implemented using the Pomegranate Python package or another suitable software package.

Referring to FIG. 6, two days (7 AM-midnight) of exemplary data sampled from a trained Markov chain of order 1 (benchmark model) for each structural option are depicted. This data follows the same axes and grayscale values as the ground truth data of FIG. 3. That is, time is sequenced form left to right—in this instance beginning from 7 am on the left of each of the 6 samples and extending to midnight on the right for each of the 6 samples. In general, for Flat and Hierarchical structures, STS models have unrealistically short spell length; that is, they jump between apps too often. DSSDS models (which sample a necessarily different symbol and the duration to remain in that symbol) capture more realistic spells. For both STS and DSSDS models, the Flat structure disregards time of day—early and late app usage along with long periods logged out during the middle of the day, neither of which occurred in ground truth data. As designed, the Hierarchical models capture time-of-day trends in the data. While this data only represents two days from the MC order 1 model, the advantages and pitfalls of these structural choices are representative for all models.

The Random Surfer model is another option. In the Random Surfer model, the "surfer" (user) moves between applications (symbols) as a mixture of a symbol transition matrix T (row-stochastic matrix giving an MC model of order 1) and a "teleportation" distribution p (multinomial distribution) on the n symbols. Specifically, at each step, the user will, with probability π, choose the next symbol based on T and the current symbol, or, with probability 1–π, sample the next symbol from the multinomial distribution of symbols, p, which is independent of the current symbol. This model mimics the behavior of a surfer browsing through web pages, choosing at each step to either follow a link on the current page, or jump to an entirely unrelated page. The model is parameterized by π, p, and T, which are learned from data by optimizing the posterior distribution (Maximum a Posteriori estimate), using a gradient ascent algorithm. The optimization need not be convex, but is in this embodiment; hence, other optimization methods besides gradient ascent may be more appropriate in alternative embodiments. In the current embodiment, gradient ascent provides sufficient optimization as the function is nearly convex. The hyperparameters of the current implementation define the prior distributions on each parameter: mixing parameter $\pi$~Beta(a), transition matrix rows (multinomials) $T$ (i •)~Dirichlet ($\beta_i$) and multinomial p~Dirichlet ($\delta$). As shown in Table 1, the value 20 is utilized for both alpha components a, strongly encouraging equal use of T and p, and the use of a value of 1.1 for all Dirichlet values.

By way of an illustrative example, results for a particular user are presented for which 42 days of sequential data after the preprocessing step was collected across about two months. For the hierarchical models, K=7 clusters were found for this user by the elbow method. A sample of the clusters is depicted in FIG. 7. The K value varies per user in empirical experiments, so this parameter is typically learned per user, but in other embodiments it need not be.

In this example, trends based on each of the structural decisions (i.e., flat vs. hierarchical and STS vs. DSSDS) are discussed. Referring to FIG. 6, representative samples from the benchmark model, (MC, m=1) for each of the four structural decisions are illustrated and compared to the exemplary ground-truth data shown in FIG. 3. In short, regardless of sequence model choice, STS representations result in spell lengths that are all very short—i.e., apps are changed quite often and too sporadically to be considered realistic. This can be explained by considering sampling the same applications for an extended period of time. Although longer spells are not infrequent, the probability of staying in the same app, say P(a|a), is small since such data has so many application changes. Thus, the probability of a spell of length k is (equal for MC with m=1 or otherwise close to) $P(a|a)^k$, which tends to trend toward zero quickly as k grows.

This example shows that the Hierarchical temporal structure captures time-of-day trends. Overall, regardless of the sequential model choice, the DSSDS Hierarchical structure, provides realistic spell lengths (app use duration) and respects trends based on the time of day.

Figure 8A:
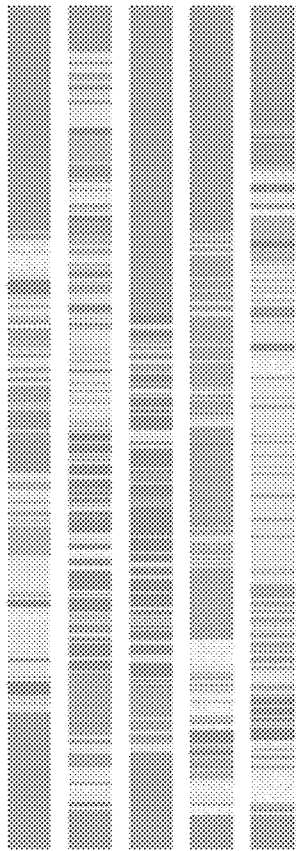
FIGS. 8A-C illustrate samples from different DSSDS Hierarchical models trained on sequences from user behavior data of FIG. 3.
Figure 8B:
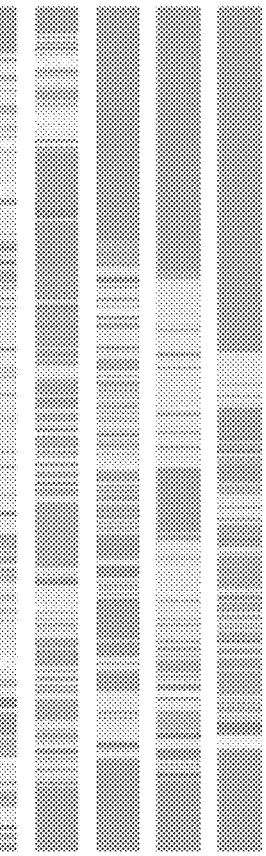
Figure 8C:
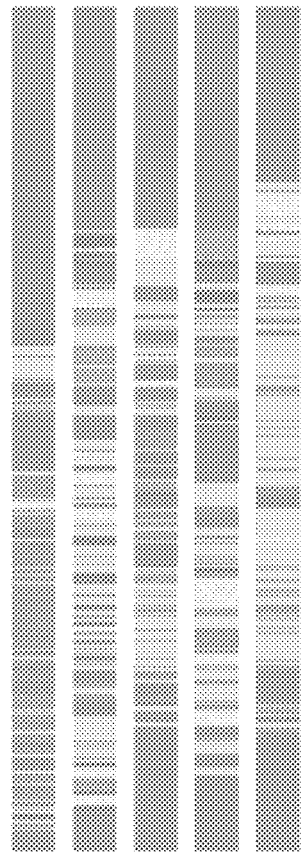

FIGS. 8A-C depict five days sampled from DSSDS Hierarchal models (K=7 clusters, 1 hour window length) trained on sequences from the user behavior data depicted in FIG. 3. Specifically, FIG. 8A depicts five sample sequences of active applications generated from a Markov Chain model with m=2 and FIG. 8B depicts five sample sequences of active applications generated from a sequence Hidden Markov Model with $n_h$=5. Both of these sets of sample sequences provide realistic generated application sequences. FIG. 8C depicts five sample sequences of active applications generated from a Random Surfer model. In the current embodiment, the DSSDS Hierarchical with MC or HMM models provide suitably realistic computer user behavior data for use in emulation, though other model choices can also provide suitable user behavior data in alternative embodiments. It is worth noting that the Hierarchical temporal structure allows different sequential model types per cluster (e.g., $M_1$ is MC, while $M_2$ is Random Surfer). Different user input data may excel with different model selections, for example, for clusters with high entropy and overall short spells, the Random Surfer sequential model may excel relative to the MC and HMM models.

The user behavior emulation of the current embodiments can be deployed inside a cyber-range having a suitable software architecture. One exemplary software architecture 900 suitable for such deployment is illustrated in FIG. 9 and described herein. The depicted software architecture is scalable, enabling hundreds or thousands of emulators to run simultaneously, and extensible, allowing additional user actions to be added and expanded with minimal effort using Python.

In operation, a data driven user behavior emulation model configuration file 902 generated in accordance with the present disclosure is provided to emulator software running on each device. The emulator software performs the actions specified by the configuration file to emulate a user's actions, including web browsing, document creation and editing, email, ssh, ftp, shell commands, and other computer user behaviors.

The emulation software 904 can execute on a processor of the device and be configured such that individual action types are plugins that use a common interface. This allows new actions to be added with minimal effort by creating a Python plugin that conforms to this interface. To provide network services inside cyber-ranges where they may not already be available. For example, Docker containers 906 or other suitable hosted service containers can be utilized to host common services such as email, SSH, SFTP, CUPS, mDNS, SNMP, Telnet, or other common computer related services.

When running, the emulator software 904 can log its actions and status using a distributed event streaming platform, such as a Kafka stream 910. Other applications can subscribe to this stream in order to log or analyze emulator behaviors. In the depicted architecture, a management server 908 runs alongside a website 914 built using the MEAN (MongoDB, Express.js, AngularJS, Node.js) stack 912. The website 914 can display summary statistics for emulators, such as the total number of each action type that has run, as well as statistics for individual emulators, including current action, time of last heartbeat message received for that emulator, and other relevant information. The website can also be used to send messages to individual emulators through the server 908, in this way, the server can act as an emulation orchestrator, fulfilling the orchestrator roll discussed in connection with FIG. 4 above. These messages can be sent as interrupts, so that the emulator ceases its current action to perform the one specified, or such that they are simply added to the end of the existing action queue.

When using such an emulation architecture for data generation or testing, the system can be configured such that the emulated user and the management server communicate out of band from the traffic generated by the emulated user nodes. This ensures generated traffic is from the emulated user's actions and not from contact with the management server. In cases with a limited number of emulators or a more lightweight solution is desired, the user behavior configuration file generation and emulation can be run headless without connecting to either the frontend or the management server. The system can be configured to log locally, store less verbose logging information, or not to log at all, which can be helpful when running headless or depending on the particular application.

Accordingly, the present disclosure provides a probability-based solution for emulating realistic user behavior on end devices. As discussed in the background, existing user emulation technologies generally ether (1) model and generate network traffic directly, or (2) replay recorded user behaviors, and (3) use human generated configuration files approximated from real data. The first group of emulation technologies are fundamentally different from the embodiments of the present disclosure because they replay or generate network traffic, and do not emulate user behavior on end devices. The second group of emulation technologies are also fundamentally different because they simply replay recorded user behaviors. and do not generate any new user behaviors. Finally, to the extent some systems utilize human generated configuration files approximated from real data, the models used in these emulators are not based on measurements of individual user behaviors. In contrast to the three approaches used by these existing technologies, the present disclosure provides the ability to generate unlimited, novel sequences of realistic behavior by building models from collected user data. Embodiments of the present disclosure therefore produce an essentially endless supply of high fidelity user behaviors.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A data processing apparatus, having memory encoding instructions that, when executed by the data processing apparatus, cause the data processing apparatus to perform operations comprising:
receiving computer-user activity data, wherein the computer-user activity data expresses attributes of user behavior including one or more of activity order, duration, and time of day, wherein the activity order comprises an order in which a user switches focus from one application to another,
modeling user behavior observed in the received computer-user activity data with a time-aware user behavior probabilistic model,
and generating new user behavior based on the modeled user behavior by generating new sequences similar to inputs with regard to one or more of the activity order, the duration, or the time of day;
and additional instructions that, when executed by one or more processors of a computer system communicatively coupled with the data processing apparatus, cause the one or more processors to perform operations comprising:
driving the computer system, using the generated user behavior, to emulate a real user using the computer system.

2. The data processing apparatus of claim 1, wherein the received computer-user activity data comprises: a timestamped sequence of active applications sampled periodically at a frequency, and timestamped metadata indicative of at least one of a user being idle, a user quitting an application, and a user opening a new tab.

3. The data processing apparatus of claim 1, wherein the operations comprise producing the time-aware user behavior probabilistic model by performing data preprocessing, and applying a stochastic model, and wherein the stochastic model comprises one or more of a Markov model, a hidden Markov model, and a Random Surfer model.

4. The data processing apparatus of claim 1, wherein the inputs with regard to the time of day comprise one or more times of day at which each application is used.

5. A data processing apparatus, having memory encoding instructions that, when executed by the data processing apparatus, cause the data processing apparatus to perform operations comprising:
receiving computer-user activity data, wherein the computer-user activity data expresses attributes of user behavior including one or more of activity order, duration, and time of day, wherein the activity order comprises an order in which a user switches focus from one application to another,
modeling user behavior observed in the received computer-user activity data with a time-aware user behavior probabilistic model,
and generating new user behavior based on the modeled user behavior by generating new sequences similar to inputs with regard to one or more of the activity order, the duration, or the time of day, wherein the inputs with regard to duration comprise a distribution of consecutive subsequence lengths for each application;
and additional instructions that, when executed by one or more processors of a computer system communicatively coupled with the data processing apparatus, cause the one or more processors to perform operations comprising:
driving the computer system, using the generated user behavior, to emulate a real user using the computer system.

6. The data processing apparatus of claim 5, wherein the distribution of consecutive subsequence lengths for each application comprises uninterrupted time spent in each application.

7. A data processing apparatus, having memory encoding instructions that, when executed by the data processing apparatus, cause the data processing apparatus to perform operations comprising:
receiving computer-user activity data, wherein the computer-user activity data expresses attributes of user behavior including one or more of activity order, duration, and time of day, wherein the activity order comprises an order in which a user switches focus from one application to another,
modeling user behavior observed in the received computer-user activity data with a time-aware user behavior probabilistic model,
generating new user behavior based on the modeled user behavior, and refining the modeling of user behavior to ensure that a distribution of generated behavior is indistinguishable from that of a real user; and additional instructions that, when executed by one or more processors of a computer system communicatively coupled with the data processing apparatus, cause the one or more processors to perform operations comprising:

driving the computer system, using the generated user behavior, to emulate a real user using the computer system.

8. The data processing apparatus of claim 7, wherein the operation of generating new user behavior comprises producing one or more configuration files, and the operation of driving the computer system using the generated user behavior comprises running one or more user emulators corresponding to respective configuration files.

9. The data processing apparatus of claim 8, wherein the operation of running each user emulator comprises logging information for monitoring the status of the user emulator.

10. The data processing apparatus of claim 8, wherein the operation of running each user emulator comprises receiving instructions for activating or de-activating the user emulator.

11. The data processing apparatus of claim 9, wherein the operation of logging information and receiving instructions are carried out as out-of-band traffic.

12. A system comprising:
a data processing apparatus;
a computer system communicatively coupled with the data processing apparatus; of claim 7.

13. The system of claim 12 wherein the computer system comprises the data processing apparatus.

14. A method for computer user behavior emulation, the method being encoded as instructions in memory that, when executed by one or more data processing apparatuses of a computer system, cause the one or more data processing apparatuses to perform steps comprising:

receiving a computer-user activity data, wherein the collected computer-user activity data expresses attributes of user behavior including one or more of activity order, duration, and time of day, wherein the activity order comprises an order in which a user switches from one application to another;

modeling user behavior observed in the collected computer-user activity data by using a generative user-behavior model;

generating a new user behavior based on the modeled user behavior by generating new sequences similar to inputs with regard to one or more of the activity order, the duration, or the time of day; and driving the computer system, using the generated new user behavior to emulate a real user using the computer system.

15. The method of claim 14, wherein the collecting computer-user activity data includes collecting:

a timestamped sequence of active applications sampled periodically at a frequency, and timestamped metadata indicating at least one of a user is idle, a user quit an application, and a user opens a new tab.

16. The method of claim 14 including producing the generative user-behavior model by processing the computer-user activity data, applying a stochastic model to the computer-user activity data, and wherein the stochastic model comprises one or more of a Markov model, a hidden Markov model, and a Random Surfer model.

17. The method of claim 14, wherein the inputs with regard to the time of day comprise one or more times of day at which each application is used.

18. A method for computer user behavior emulation, the method being encoded as instructions in memory that, when executed by one or more data processing apparatuses of a computer system, cause the one or more data processing apparatuses to perform steps comprising:

receiving computer-user activity data, wherein the collected computer-user activity data expresses attributes of user behavior including one or more of activity order, duration, and time of day;

modeling user behavior observed in the collected computer-user activity data by using a generative user-behavior model;

generating a new user behavior based on the modeled user behavior by generating new sequences similar to inputs with regard to one or more of the activity order, the duration, or the time of day, wherein the inputs with regard to duration comprise a distribution of consecutive subsequence lengths for each application; and driving the computer system, using the generated new user behavior to emulate a real user using the computer system.

19. The method of claim 18, wherein the distribution of consecutive subsequence lengths for each application comprises uninterrupted time spent in each application.

20. A method for computer user behavior emulation, the method being encoded as instructions in memory that, when executed by one or more data processing apparatuses of a computer system, cause the one or more data processing apparatuses to perform steps comprising:

receiving computer-user activity data, wherein the collected computer-user activity data expresses attributes of user behavior including one or more of activity order, duration, and time of day;

modeling user behavior observed in the collected computer-user activity data by using a generative user-behavior model;

generating a new user behavior based on the modeled user behavior;

refining the modeling of user behavior to ensure that a distribution of generated behavior cannot be distinguished from that of a real user; and driving the computer system, using the generated new user behavior to emulate a real user using the computer system.

21. The method of claim 20 wherein
generating the new user behavior comprises producing one or more configuration files, and driving the computer system using the generated user behavior comprises running one or more user emulators corresponding to respective configuration files.

22. The method of claim 21, wherein running each user emulator comprises logging information for monitoring the status of the user emulator.

23. The method of claim 21, wherein running each user emulator comprises receiving instructions for activating or de-activating the user emulator.

24. The method of claim 23, wherein the logging information and receiving instructions are carried out as out-of-band traffic.

* * * * *